April 20, 1971     HANS-PETER HUBER     3,575,702

AUTOMATIC PRINTING METHOD AND APPARATUS

Filed Aug. 22, 1968

INVENTOR.

HANS-PETER HUBER

BY Michael J. Striker

United States Patent Office 3,575,702
Patented Apr. 20, 1971

3,575,702
AUTOMATIC PRINTING METHOD AND APPARATUS
Hans-Peter Huber, Munich, Germany, assignor to Agfa-Gevaert Aktiengesellschaft, Leverkusen, Germany
Filed Aug. 22, 1968, Ser. No. 754,567
Claims priority, application Germany, Aug. 27, 1968,
P 15 97 066.8
Int. Cl. G03c 5/08; G03b 27/78
U.S. Cl. 96—23
7 Claims

ABSTRACT OF THE DISCLOSURE

Reproduction of images of color photographic positive or negative originals onto printing paper is regulated by an adjustable exposure control which receives impulses from an evaluating circuit. The latter adjusts the exposure control as a function of the average density of that area of the original which has a maximum average contrast. The average contrast of several areas of the original can be determined by the process of elimination.

BACKGROUND OF THE INVENTION

The present invention relates to automatic color printing techniques, and more particularly to a method and apparatus for making copies or prints from negative or positive originals with photoelectric exposure control, especially from color photographic originals.

In presently known color printing techniques, analysis of a color photographic negative or positive original for printing has been confined to the central or median part of the original. This is based on the assumption that the most important part of the image is located in the central part of the original. The exposure is controlled in such a way that the central part of the image on the original is reproduced with an average grey value which insures satisfactory reproduction of such central part. However, the aforediscussed assumption that the most important portion of the image can be found in the central part of the original is fallacious in many instances; therefore, the printing or copying apparatus must be supervised by a highly skilled attendant who is in a position to adjust the exposure by hand. Such adjustment consumes much time and its accuracy depends exclusively on the skill, experience, carefulness and conscientiousness of the operator.

Examinations conducted with a view to find ways of automatically controlling the exposure of negative or positive color originals led to the conclusion that the conventional methods of automatically exposing an original during printing fail to produce satisfactory results when the important part or parts of the image are located outside of the scanned area and when the average density of such important parts deviates considerably from the average density of the remainder of the original. This is the case when a person is photographed in front of a much lighter background or when the image shows a strongly illuminated face in front of a dark background (this takes place in exposures with artificial illumination of the subject).

SUMMARY OF THE INVENTION

One object of the invention is to provide a novel method of automatically reproducing images of originals on printing paper or the like in a way to invariably insure satisfactory reproduction of the most important part of the image.

Another object of the invention is to provide a method according to which the exposure of printing paper to light in several colors is controlled as a function of the average density of one or more selected areas of the original.

A further object of the invention is to provide an apparatus which can be resorted to in the practice of the above method.

An additional object of the invention is to provide an apparatus which can automatically reproduce the images of color photographic negative or positive originals in a way to invariably insure satisfactory reproduction of the most important part or parts of the image.

The improved method comprises the basic steps of scanning several areas of an original to locate at least one area of very high or maximum average contrast, and regulating the exposure as a function of the density of such very high or maximum average contrast area.

If the originals are color photographic negatives or positives, the scanning step comprises locating the area of maximum average contrast in each of a plurality of colors (for example, red, blue and green), and the regulating step then comprises regulating the exposure in each of such plurality of colors as a function of the density of said maximum average contrast area in the respective color.

The scanning step may include producing signals which are indicative of the average contrast and location of successively scanned areas of the original, comparing each freshly produced signal with a previously produced signal with a previously produced signal, and storing that signal which is indicative of the higher average contrast. The regulating step then comprises regulating the exposure as a function of the stored signal.

The scanning step may also comprise simultaneously scanning several areas of the original (or the entire original) and determining the area of maximum average contrast by a comparison of the results of such examinations.

The regulating step may comprise regulating the exposure as a function of the average density of a single area or of several areas with high average contrast. It is normally preferred to scan areas whose size equals at least ⅙ of the area of the original. Each such scanned area may be of polygonal outline.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
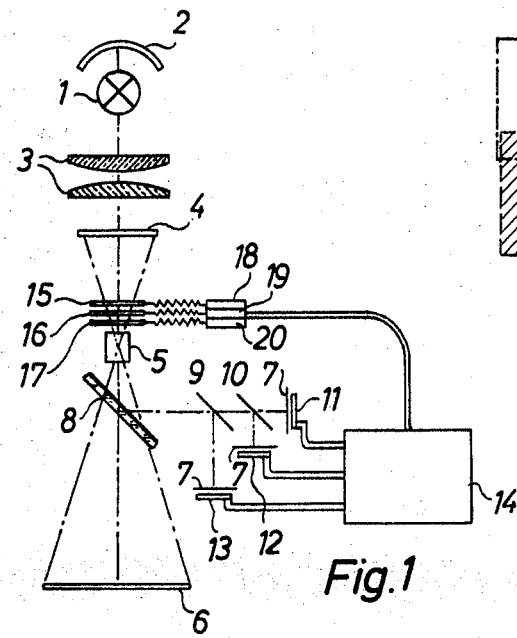
FIG. 1 is a schematic partly elevational and partly sectional view of a printing apparatus which embodies one form of the invention.

The method of the present invention is based on the recognition that the most important part of an image is the one which exhibits a large average contrast. In other words, it is assumed that the photographer or another person desirous of obtaining reproductions of a color transparency is not particularly or primarily interested in satisfactory reproduction of large uniform areas of an image but rather with optimum reproduction of areas or portions with substantial variations in density. Such areas with substantial variations in density normally occupy only a certain portion of the original and the variations in density of such selected areas can be defined as areas with average contrast, i.e., the sum of differences in density between all scanned spots of the selected area divided by the number of scanned spots. The aforementioned sum of differences is smaller if the scanned area is subjected to uniform illumination.

In accordance with the present invention, exposure of originals during printing is regulated as a function of the result of determination of the average density of that part of the transparency which exhibits the maximum average contrast. Thus, the improved method includes the steps of scanning several areas of an original to determine the area of maximum average contrast and thereupon regulating the exposure as a function the average density of such maximum average contrast area.

Accurate determination of average contrast of a selected area of an original is expensive and consumes much time. This normally involves spotwise scanning of the entire original, mathematical determination of densities of all spots, and calculation of the sum of differences of such densities. Therefore, it is preferred to resort to a simplified mode of determining average contrast, for example, by employing a process according to which a photoelectric scanner scans a series of spots and produces A-C signals which are subjected to a frequency analysis. The steepness of flanks of the curve, the frequency and/or the amplitude of such curve are analyzed in a harmonic analyzer and the results of such analysis permit calculation of the average contrast.

A modified procedure for determining the average contrast is disclosed in German DAS No. 1,173,327. The apparatus of this publication employs two similar photoelectric elements of large area each having a non-linear characteristic curve. Such curve indicates the dependency of photocurrent on the density of light. The elements furnish a potential which is indicative of the average contrast. The image of a portion of the original is reflected onto one of the photosensitive elements and the image of the same portion of the original is reflected onto the other photosensitive element but with the interposition of a diffuser, e.g., a plate-like diffuser. The difference between the two photocurrents or potentials is indicative of the non-uniform illumination of the one element and hence of the contrast of the scanned portion of the original.

In accordance with still another procedure, disclosed in the copending application Ser. No. 736,044, filed on June 11, 1968 by Polke et al. and assigned to the same assignee, a base whose size corresponds to that of an original carries a large number of photoelectric resistors some of which are connected in series and the others connected in parallel. The magnitude of the photocurrent passing through the parallel-connected resistors is indicative of the illuminated portions of the transparency whereas the current flowing through the series-connected resistors indicates the shaded portions of the transparency. Evaluation of the two currents leads to determination of the average contrast.

The above-outlined procedures of calculating the average contrast of a selected area of an original can be resorted to in the practice of my invention. However, it is equally possible to resort to other known techniques which are sufficiently economical to warrant their application in the present method. It was found that techniques according to which the average contrast is expressed in D-C current voltage are particularly suited in the practice of my invention.

Referring now to the drawings in detail, FIG. 1 shows a printer including a light source 1, a reflector 2, a condenser lens system 3, a holder (not shown) for an original 4, an objective 5 which focuses the image of the original onto printing paper 6, and a partially light-transmitting mirror 8 located at 45 degrees to the axis of the objective 5 to reflect some of the light toward two dichroic light dividers or filters 9, 10. The contrast measuring devices for the colors red, blue and green are respectively shown at 11, 12 and 13. The devices 11–13 are of known construction; they are positioned in such a way that each thereof reecives a sharply defined image in the respective color. A diaphragm 7 is located in front of each contrast measuring device and all of these diaphragms are movable in synchronism so as to shift their apertures across the respective images. The areas of their apertures correspond to between ⅙ and ¼ of the area of the original 4.

The contrast measuring devices 11–13 are connected to a computerized evaluating circuit 14 which is also of known design. Color filters 15, 16, 17 in subtractive colors are respectively movable by electromagnets 18, 19, 20 across and away from the path of light between the objective 5 and original 4 to control the exposure. The electromagnets are controlled by the evaluating circuit 14. The parts 15–20 constitute an adjustable exposure control, and the parts 7–13 constitute a measuring means which determines the average contrast of several areas of the original 4. The evaluating circuit 14 adjusts the exposure control 15–20 as a function of the average density of at least one area of high average contrast.

Figure 2:
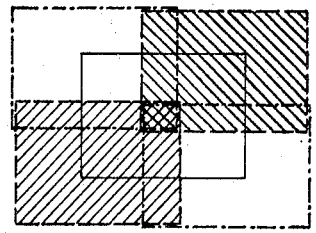
FIG. 2 illustrates the manner in which the image of an original can be scanned by the apparatus of FIG. 1 to determine the area of maximum average contrast.

The operation is as follows:

The apertures of the diaphragms 7 permit light passing through certain portions of the image of the original 4 to reach the corresponding contrast measuring devices 11 to 13. The results of such measurements are transmitted in the form of signals which reach the evaluating circuit 14 together with signals indicating the positions of diaphragms 7. These diaphragms can be moved as a unit to several discrete positions, for example, in a manner as shown in FIG. 2. It will be noted that the positions of diaphragms 7 overlap in part to insure that the area of maximum contrast is detected without fail or with a high degree of probability. The evaluating circuit 14 determines for each contrast measuring device 11, 12, 13 that position of the corresponding diaphragm 7 in which the diaphragms permit passage of light in the respective color through the area of maximum average contrast. Prior to actual exposure, each diaphragm 7 is moved to the position in which it permits light passing through the area of maximum average contrast to reach the respective density measuring device.

The evaluating circuit 14 then controls the electromagnets 18–20 for the color filters 15–17 in such a way that, in accordance with the neutral grey principle, the amounts of copying light reaching the three areas of maximum average contrast would produce a neutral grey upon exposure of a single carrier of photographic emulsion.

Since the areas of maximum average contrast in the various colors are likely to coincide, it is possible to operate with a single contrast measuring device, for example, with the device 11 of FIG. 1. However, it is then necessary to replace the devices 12 and 13 with other means for determination of average color density of the image on the original.

Figure 3:
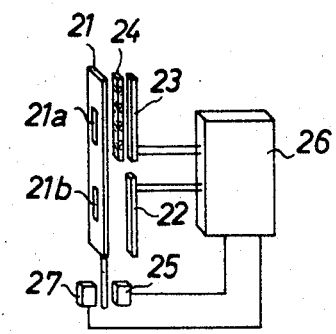
FIG. 3 is a fragmentary perspective view of a second apparatus.

If the average contrast is measured in accordance with the teaching of the aforementioned German DAS No. 1,173,327, the apparatus can include the structure which is shown in FIG. 3. This apparatus comprises a pair of photoelectric cells one of which is exposed to diffused light and the other of which is exposed to light passing through the original. The signal produced by the one cell can be used to regulate the exposure control. No other density examination of the transparency is then necessary.

FIG. 3 shows a movable diaphragm 21 having apertures 21a, 21b each of which has an area approximating one-fourth of the area of the original. The aperture 21b is located in front of a cell 22 and the aperture 21a is located in front of a diffusor 24 which is placed in front of a second photoelectric cell 23. The area of each of the cells 22, 23 approximates the area of the image transmitted by the light divider. However, the image reaching the cell 23 is blurred by the diffusor 24 so that this cell is illuminated with a high degree of uniformity. The characteristics of cells 22, 23 are not linear, i.e., when these cells receive the same amounts of light but in different distribution, they produce photocurrents of different strength.

The diaphragm 21 is movable by a drive 25 between a plurality of positions, for example, between the positions shown in FIG. 2. Each position of the diaphragm 21 is signalled by drive 25 to an evaluating circuit 26 which also receives output signals produced by the cells 22, 23. These output signals indicate the average contrast of successively scanned areas whereas the signals transmitted by drive 25 indicate the locations of such areas. The apertures 21a, 21b transmit to the cells 22, 23 light from the same part of the original. At such time, the evaluating circuit 26 produces a so-called holding function. This means that the circuit stores first signals indicating a first position of the diaphragm 21 and the corresponding contrast value. When the diaphragm 21 is moved to a second position and the corresponding contrast value is higher, the first signals are erased and the second signals retained. On the other hand, and if the contrast value in the second position of the diaphragm 21 is lower than in the first position, the first signals are retained. Thus, when the scanning operation is completed, the evaluating circuit 26 memorizes only those signals which indicate the maximum contrast value and the corresponding position of the diaphragm 21. The locating device 27 of FIG. 3 moves the diaphragm 21 to the position which is memorized by the evaluating circuit 26 upon completion of the scanning operation. The circuit 26 then controls the exposure time in dependency on the average density of the area with maximum average contrast. It will be seen that the evaluating circuit 26 determines the area of maximum average contrast and the location of such area by the process of elimination.

Figure 4:
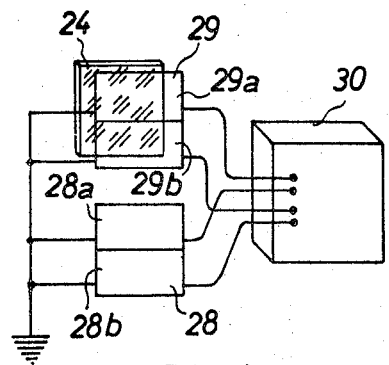
FIG. 4 is a fragmentary perspective view of a third apparatus.

FIG. 4 illustrates a further arrangement for determination of the maximum average contrast. This arrangement comprises two photoelectric cells 28, 29 each having an area corresponding to that of the image on the original. The cells are analogous to the cells 22, 23 of FIG. 3 and each thereof is subdivided into a plurality of abutting cell sections shown at 28a, 28b and 29a, 29b. A suitable light divider, such as the diaphragm 21 of FIG. 3, transmits to each cell the image of the original whereby the light reaching the sections of the cell 29 must pass through a diffusor 24. As a rule, each of the cells 28, 29 is divided into a substantial number of sections, i.e., into more than two sections. It is often preferred to divide each cell into four, five or six sections if the image of the transparency is transmitted at the ratio of one-to-one. The evaluating circuit 30 receives simultaneous signals which indicate the average contrast of each part of the original. This circuit 30 is provided with suitable means for comparing the average contrasts and for retaining only those signals which indicate the higher average contrast and the location of the area of higher average contrast. In this way, the maximum average contrast is determined automatically, together with the location of the area which exhibits such maximum average contrast. The corresponding section of the cell 29 is then connected to the exposure control by way of the circuit 30. Such selection of the maximum average contrast can be carried out during exposure, provided that it can be completed within an interval which is shorter than the shortest exposure time. That amount of light which reaches the printing paper during determination of the maximum average contrast is then deducted from the total amount of light which should reach the paper during exposure. It is further clear that the operation of the exposure control can be regulated in dependency on the average density of two or more areas with relatively high average contrast.

Another method of determining the area of maximum average contrast includes shifting a set of masks from the outer edges toward the center of the original and continuously measuring the average contrast until the contrast of the exposed area of the original reaches a maximum value. In this way, one can eliminate the areas of low average contrast which are often adjacent to the marginal portions of the original.

If the determination of maximum average contrast takes up more time than the shortest exposure time to be expected, the determination of average contrast must precede the exposure. In such instances, the mirror 8 of FIG. 1 can be replaced by a fully reflecting mirror which is pivotable or otherwise movable away from the path of light prior to actual exposure. Alternatively, a shutter can be placed between the printing paper 6 and the mirror 8, and such shutter remains closed during determination of the area with maximum average contrast.

An important advantage of the improved method is that stepwise examination of the original for the purpose of determining the area with maximum average contrast allows for automatic exposure control in such a way that the important part of the image is most likely to be reproduced with maximum accuracy. It is presumed, of course, that the important part is one with maximum average contrast. In color photographic negative or positive originals, the maximum average density is normally found in that part which does not exhibit large areas of uniform coloration.

What is claimed as new and desired to be protected by Letters Patent is set forth in the appended claims:

1. A method of controlling the exposure during reproduction of images of negative or positive originals onto photosensitive material, comprising the steps of scanning several areas of an original to locate the area of maximum average contrast; and regulating the exposure as a function of the average density of such maximum average contrast area.

2. A method as defined in claim 1 for controlling the exposure during the reproduction of images of color negative or positive originals, wherein said scanning step includes locating the area of maximum average contrast in each of a plurality of colors and wherein said regulating step comprises regulating the exposure in each of said plurality of colors as a function of the average density of said maximum average contrast area in the respective color.

3. A method as defined in claim 1, wherein said scanning step comprises producing signals indicative of the average density and location of successively scanned areas of the original, comparing each freshly produced signal with a previously produced signal, and storing that signal which is indicative of the average density of the area of maximum average contrast, said regulating step comprising regulating the exposure as a function of said stored signal.

4. A method as defined in claim 1, wherein said scanning step comprises simultaneously examining several areas of the original and determining the area of maximum average contrast by a comparison of the results of such examinations.

5. A method as defined in claim 1, wherein said regulating step comprises regulating the exposure as a function of the average density of several areas with high average contrast.

6. A method as defined in claim 1, wherein said scanning step comprises scanning areas each of which equals at least one-sixth of the overall area of the original.

7. A method as defined in claim 6, wherein each of said scanned areas is of polygonal outline.

References Cited

C. J. Bartleson and R. W. Huboi: Exposure Determination Methods for Color Printing: The Concept of Optimum Correction Level, Journal of the S.M.P.T.E., vol. 65, April 1956, pp. 209–211.

J. TRAVIS BROWN, Primary Examiner

A. T. SURO PICO, Assistant Examiner

U.S. Cl. X.R.

355—68